United States Patent [19]

Couderchon et al.

[11] Patent Number: 5,441,578
[45] Date of Patent: Aug. 15, 1995

[54] METHOD FOR PRODUCING SOFT MAGNETIC ALLOYS WITH VERY HIGH PERMEABILITY AND ALLOYS RESULTING THEREFROM

[75] Inventors: Georges Couderchon; Lucien Coutu, both of Sauvigny les Bois; Michel Faral, Nevers, all of France

[73] Assignee: Imphy S. A., Puteaux, France

[21] Appl. No.: 98,938

[22] Filed: Jul. 29, 1993

[30] Foreign Application Priority Data

Jul. 30, 1992 [FR] France .................. 9209462

[51] Int. Cl.$^6$ ............................. C21C 7/076
[52] U.S. Cl. .................. 148/120; 75/10.25; 75/10.53; 75/10.55
[58] Field of Search ............... 148/120, 122; 75/10.25, 75/10.48, 10.53, 10.55, 10.58

[56] References Cited

U.S. PATENT DOCUMENTS

| | | |
|---|---|---|
| 2,558,104 | 6/1951 | Scharschu .................. 75/10.58 |
| 3,615,903 | 10/1971 | Perry et al. .................. 148/122 |
| 3,857,702 | 12/1974 | Corbett . | |
| 4,450,007 | 5/1984 | Herchenroeder et al. . | |

FOREIGN PATENT DOCUMENTS

| | | |
|---|---|---|
| 1091343 | 10/1960 | Germany . |
| 3722167 | 7/1988 | Germany .................. 75/10.25 |
| 4105507 | 8/1991 | Germany . |

*Primary Examiner*—George Wyszomierski
*Attorney, Agent, or Firm*—Oblon, Spivak, McClelland, Maier, & Neustadt

[57] ABSTRACT

Method for producing soft magnetic alloys with very high permeability, in which an ingot is cast containing in its composition more than 70% nickel or more than 45% cobalt, the metal having, or not having, been subjected to a secondary metallurgical step, the ingot is remelted under an electroconductive slag, the remelted ingots being converted into strips after hot rolling then cold rolling, the strips then being subjected to a treatment for developing magnetic characteristics, in which method the alloy is remelted under an electroconductive slag comprising at least the first three components of the system: $CaF_2$, $CaO$, $SiO_2$, $Al_2O_3$, and defining a zone in a ternary diagram delimited by the following proportions by weight:

$CaF_2$ (50–75)%
$CaO$ (20–30)%
$SiO_2$ (5–15)%
with $Al_2O_3 < 3$%.

1 Claim, 1 Drawing Sheet

METHOD FOR PRODUCING SOFT MAGNETIC ALLOYS WITH VERY HIGH PERMEABILITY AND ALLOYS RESULTING THEREFROM

The present invention relates to a method for producing soft magnetic alloys with very high permeability, in which an ingot is cast containing in its composition more than 70% nickel or more than 45% cobalt, the metal having, or not having, been subjected to a secondary metallurgical step, the ingot is remelted under an electroconductive slag, the remelted ingots being converted into strips after hot rolling then cold rolling, the strips then being subjected to a treatment for developing the magnetic characteristics. The invention also relates to the alloys resulting from this method.

The magnetic properties of soft magnetic alloys, such as for example the permeability, the coercive field and the losses, depend greatly on the degree of inclusional pureness of the alloys. The goal of purity has always been persued by all available technical means. Mention may be made for this purpose, for example of the choice of starting materials, production of the alloy under vacuum, the treatment of the liquid alloys by slags, etc.

The method of electroslag remelting (ESR) is known and used industrially, particularly in the field of special steels. However, the method is very seldom or never used in the case of extra-soft magnetic alloys, because it is considered that the use of a slag introduces undesirable elements into the alloy, such as aluminium, calcium, etc., which compromise the obtaining of a good magnetic quality on the soft magnet alloy strips. It is therefore generally preferred to use direct production under vacuum starting from highly pure materials.

The inclusional density plays a very important role in the subsequent development of the magnetic properties of the products made from the strip:

on the one hand, the inclusions slow the movement of the Bloch walls during the magnetization processes and thus lead to an increase in the coercive field and a decrease in the permeabilities, on the other hand, the inclusions impair the growth of the grain, and thus lead to a poorer magnetic quality on the finished products.

Electroslag remelting of an alloy produced, for example, under vacuum makes it possible to decrease very substantially its impurity content, and its density of inclusions, and thus, after hot and cold conversion and thermal treatment, to obtain purer alloys which recrystallize faster and which give improved magnetic properties.

The object of the invention is the improvement of the chemical and metallurgical quality of a soft magnetic alloy with very high permeability, in particular a nickel-based alloy, containing in its composition more than 70% of this element, or a cobalt-based alloy, containing more than 45% of this element.

Its subject is a method in which the alloy is remelted under a slag comprising at least the first three components of the system: $CaF_2$, $CaO$, $SiO_2$ and $Al_2O_3$ defining a zone in a ternary diagram delimited by the following proportions by weight:

Calcium fluoride $CaF_2$ (50–75)%
Lime $CaO$ (20–30)%
Silica $SiO_2$ (5–15)%
Alumina $Al_2O_3 < 3\%$ Preferably, the components define a zone in a ternary diagram delimited by the following proportions by weight:

$CaF_2$ (57–67)%
$CaO$ (22–28)%
$SiO_2$ (9–15)%

The other characteristics of the invention are:

the slag furthermore comprises less than 3% of $Al_2O_3$ the alloy before remelting comprises in its composition by weight:

nickel (70–85)%
molybdenum (2–7)%
manganese (0.05–1)%
silicon (0.05–0.5)%
aluminium $\leq$ (0.015)%
carbon $\leq$ (0.02)% the rest being iron and impurities inadvertently introduced by the basic materials or by the manufacturing cycle.

In another application of the invention, the alloy before remelting comprises in its composition by weight:

cobalt (45–52)%
vanadium (0–2.5)%
complementary iron and the impurities introduced by the basic materials and the manufacturing cycle.

The invention also relates to a soft magnetic alloy with very high permeability containing more than 70% nickel, produced by the method according to the invention, characterized by its composition by weight (after remelting):

nickel (79 to 81)%
molybdenum (4.5–6)%
manganese (0.3–0.5)%
carbon <0.02%
aluminium $\leq$ (0.003)%

The following description and the single FIGURE will explain the invention better.

BRIEF DESCRIPTION OF THE DRAWING

The single FIGURE presents a ternary diagram defining the general composition of the electroconducting slag according to the invention.

DETAILED DESCRIPTION OF THE INVENTION

Figure 1:
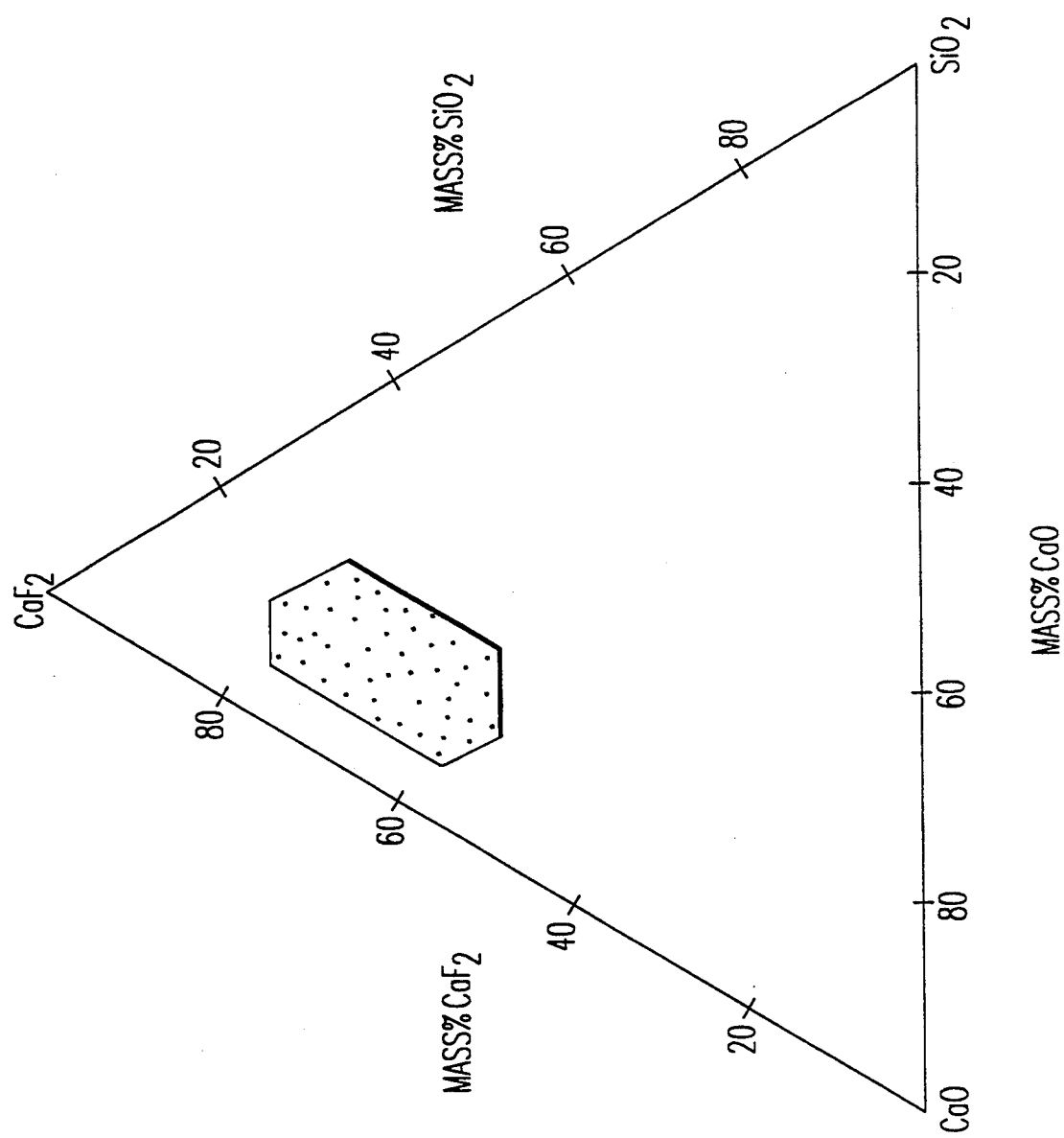

The invention is particularly suited to producing magnetic alloys with very high permeability and with low coercive fields, of the Fe Ni Mo (15-80-5) type, whose ingots are electroslag-remelted (ESR). The ingots thus obtained are then converted into thin strips after hot rolling then cold rolling. The thin strips are then thermally treated under temperatures greater than 1000° C. in order to develop their magnetic characteristics.

The basic alloys, at first melting, whose composition is the following:

nickel (70–85)%
molybdenum (2–7)%
manganese (0.05–1)%
silicon (0.05–0.5)% the rest being iron, are melted by any conventional technique which pollutes the liquid metal to the smallest possible degree, such as, for example, an arc furnace, associated, or not associated, with a secondary metallurgical stage, an induction-heated crucible, etc.

The principal elements of the alloy are adjusted to their nominal value and the undesirable elements are held at a low level. The liquid alloy is cast in an ingot of size adapted to the subsequent electroslag remelting.

In a second operation according to the invention, the ingots are remelted in a furnace with consumable electrodes under a slag whose composition by weight is the following:

$CaF_2$ (50–75)%
CaO (20–30)%
$SiO_2$ (5–15)%
$Al_2O_3 < 3$%

The electroconducting slag interacts with the molten alloy and determines, by its composition and its intrinsic characteristics, the properties of the alloy produced and the magnetic properties of the products made with the strips obtained after rolling the alloy.

It is advantageous to use, in the CaO, $SiO_2$, $CaF_2$ ternary diagram, the zone with low melting points and high $CaF_2$ content. The $CaF_2$, further to its role as a flux which promotes the dissolving of CaO and $SiO_2$ and fixes the remelting temperature, contributes to decreasing the sulphur content. Below 50% of $CaF_2$, this operation is more difficult, and above 75% of $CaF_2$, the composition of the slag becomes very difficult to control.

The CaO is introduced into the slag for its desulphurizing power, which requires a minimum content of 20%. Above 30% by weight, the viscosity of the slag increases too rapidly with temperature.

Below 5% of $SiO_2$, the alloy produced comprises small inclusions which reduce the magnetic properties of the products obtained.

Above 15% of $SiO_2$, the alloy becomes difficult to convert in the hot state.

The FIGURE presents a ternary diagram which, according to the invention, defines the preferred compositional region which provides the qualities of the alloy and of the products obtained.

In the preferred compositional region: $CaF_2$ between 57 and 67%, CaO between 22 and 28%, $SiO_2$ between 9 and 15%, corresponding to the slag used for the examples subsequently described, an alloy whose composition is the following: nickel 80%, molybdenum 5%, manganese 0.4%, silicon 0.2%, aluminium 0.003%, carbon 0.015%, produced by melting under vacuum, comprises a density of 50 inclusions per $mm^2$ in size greater than one micron. After electroslag remelting, the inclusive density of the alloy is less than 10 inclusions per $mm^2$. Furthermore, remelting under slag according to the invention makes it possible to improve the hot forge-ability of the ingots, and to reduce in number the macrodefects on the finished products.

The slag according to the invention may furthermore contain up to 3% of $Al_2O_3$ without impairing the quality of the alloy. The presence of $Al_2O_3$ in the slag at a concentration less than 3% generates an aluminium content of the remelted ingot which is less than 50 ppm by weight.

This low alumminium concentration introduced by the $Al_2O_3$ makes it possible to retain good magnetic characteristics on the alloy sheets after thermal treatments.

The slag is also suited to the production of soft magnetic alloys whose composition by weight is the following: cobalt at 45 to 52%, vanadium at 0 to 2.5%, complementary iron, without introducing electropositive elements such as aluminium which is harmful for the magnetic properties of the final products.

The ingots coming from the remelting under slag are hot-converted by conventional techniques, to obtain strips of thickness ranging from 3 to 7 mm. The hot-rolled strips, after descaling are cold-rolled to thicknesses ranging from 0.01 to 3 mm. In this rolling operation, the degree of pinching of the last cold rolling is generally less than 80%. The strips obtained by rolling are then shaped into a product such as a magnetic circuit and generally treated at temperatures greater than 1000° C. under pure, dry hydrogen in order to develop magnetic characteristics.

Three examples coming from industrial manufacturing make it possible to illustrate the results obtained.

EXAMPLE 1

The high-quality raw material corresponding to the composition described hereinabove is melted in an induction furnace under high vacuum then deoxidized by carbon. The liquid metal is poured into 3 tonne ingots. These ingots are remelted with the electroconducting slag according to the invention. The composition of the alloy after ESR remelting is as follows: nickel 80.25%, Mo 4.8%, Mn 0.4%, Si 0.23%, Al 0.003%, C 0.012%, iron making up the rest.

After hot then cold conversion into strips of 1.5 mm thickness, then annealing for 6 hours at 1200° C. under pure, dry hydrogen followed by cooling at approximately 200° C./h, the magnetic characteristics obtained are the following: coercive field $H_c = 0.003$ Oe (0.25 A.m$^{-1}$), maximum permeability in continuous excitation $\mu_{max} = 597,000$.

The strips thus produced with the markedly improved characteristics can be used for manufacturing products such as ultrasensitive electromagnetic relays.

EXAMPLE 2

The alloy described in Example 1 was rolled into strips of 0.34 mm thickness, then treated at 1200° C. for 6 hours under hydrogen and cooled to room temperature at approximately 200° C./h. The important properties for its use are the following: coercive field $H_c = 4$ mOe (0.33 A.m$^{-1}$), the relative permeability of impedance under sinusoidal excitation at 60 Hz in a magnetic field of peak value of 5 mOe is $\mu_z = 75500$.

EXAMPLE 3

In ingots for ESR remelting are produced in a vacuum induction furnace. These ingots are then electroslag-remelted as has been described previously. The chemical composition of the ingots after remelting is the following: Ni=80.3%, Mo=4.75%, Mn=0.37%, Si=0.21%, Al=0.003%, C=0.022%, the rest being iron. These ingots are hot- and cold-converted by conventional means. However, the last rolling which brings a strip to 0.07 mm is carried out with a pinching rate of approximately 60%. The extra-thin strips thus obtained are split into 20 mm wide lengths, with which toroids are manufactured in wound strips whose inter-turn spaces are insulated by magnesia in order to prevent bonding during thermal treatment. These toroids have an internal diameter of 20 mm and an external diameter of 30 mm and are intended for manufacturing highly sensitive differential circuit breakers, and are annealed at temperatures lying between 1000° and 1200° C. under pure, dry hydrogen. They then undergo a final thermal treatment lasting one hour at approximately 500° C., adjusted to each casting, in order to regulate the magneto-crystalline anisotropy.

For the alloy described in Example 3, the thermal treatment is carried out at 1200° C. for 4 hours, followed by annealing at about 500° C. The magnetic characteristics of use under A.C. excitation at 50 Hz, are, for the relative permeability of impedance at 50 mOe peak, equal to 290,000 and for the maximum relative permeability of impedance equal to 390,000.

The method of remelting under slag according to the invention, combined with the method of converting the magnetic nickel alloy strips, makes it possible:

to improve the inclusional pureness and thus, in general the magnetic properties of these soft alloys, either by leading to higher values of permeability with traditional treatments, or by allowing treatments at lower temperature, to reduce the inclusions in number and thereby to improve the pitting corrosion.

Remelting under slag improves the forgeability of these alloys, which is very critical, and makes it possible to reduce waste in the hot conversion operations and to eliminate the internal defects which appear on the thin strips during the final thermal treatments.

We claim:

1. A method for producing a soft magnetic alloy with high permeability, comprising:
   (i) casting an ingot of an alloy, comprising more than 70% nickel or more than 45% cobalt,
   (ii) remelting said ingot under an electroconductive slag;
   (iii) converting the remelted ingot into strips after hot rolling then cold rolling;
   (iv) subjecting said strips to a treatment for developing magnetic characteristics, wherein said slag comprises at least the first three components of the system $CaF_2$, $CaO$, $SiO_2$, $Al_2O_3$ and defining a zone in a ternary phase diagram delimited by the following proportions by weight:

$CaF_2$ (56–67)%
$CaO$ (22–28)%
$SiO_2$ (9–15)%
with $Al_2O_3 < 3\%$.

* * * * *